United States Patent
Sasaki et al.

[11] Patent Number: 5,973,220
[45] Date of Patent: Oct. 26, 1999

[54] METHOD OF DISPOSAL OF METALLIC ALUMINUM-CONTAINING RADIOACTIVE SOLID WASTE

[75] Inventors: Tadashi Sasaki; Shigeru Mihara; Kazunori Suzuki, all of Oarai; Yoshimitsu Karasawa, Fujioka; Masayuki Kiyomoto, Omiya, all of Japan

[73] Assignees: JGC Corporation; Nippon Kayaku Kabushiki Kaisha, both of Japan

[21] Appl. No.: 08/935,612

[22] Filed: Sep. 23, 1997

[30] Foreign Application Priority Data

Sep. 24, 1996 [JP] Japan ..................... 8-251963

[51] Int. Cl.⁶ .................. G21F 9/30; G21F 9/34
[52] U.S. Cl. .................. 588/4; 588/20; 588/256; 588/257
[58] Field of Search ............. 588/3, 4, 18, 20, 588/251, 256, 257; 405/128, 129

[56] References Cited

U.S. PATENT DOCUMENTS

| | | | |
|---|---|---|---|
| 4,284,514 | 8/1981 | Wright | 588/256 X |
| 4,353,749 | 10/1982 | Ray et al. | 588/256 |
| 4,442,028 | 4/1984 | Wolf et al. | 588/3 |
| 4,547,290 | 10/1985 | Pichat | 588/257 |
| 4,601,832 | 7/1986 | Hooykas | 588/256 X |
| 4,834,915 | 5/1989 | Magnin et al. | 588/3 |
| 4,943,394 | 7/1990 | Lammertz et al. | 588/4 |
| 5,256,338 | 10/1993 | Nishi et al. | 588/3 |
| 5,463,171 | 10/1995 | Nishi et al. | 588/4 |
| 5,732,363 | 3/1998 | Suzuki et al. | 588/4 |

FOREIGN PATENT DOCUMENTS 0709859  1/1996  European Pat. Off. .

OTHER PUBLICATIONS

Japanese Publication No. 62238499 Abstract, Oct. 19, 1987, 1 p., English–language.
Japanese Publication No. 60119499 Abstract, Jun. 26, 1985, 1 p., English–language.
Japanese Publication No. 04287000 Abstract, Oct. 12, 1992, 1 p., English–language.
Japanese Publication No. 4200680 Abstract, Jul. 21, 1992, 1 p., English–language.
Japanese Publication No. 6102395 Abstract, Apr. 15, 1994, 1 p., English–language.
Japanese Publication No. 61–32000 Abstract, Feb. 14, 1986, 1 p., English–language.
Japanese Publication No. 4287000 Abstract, Oct. 12, 1992, 1 p., English–language.
Japanese Publication No. 8179095 Abstract, Jul. 12, 1996, 1 p., English–language.

*Primary Examiner*—George Suchfield
*Attorney, Agent, or Firm*—Webb Ziesenheim Logsdon Orkin & Hanson, P.C.

[57] ABSTRACT

Disclosed is a method of disposal of metallic aluminum-containing solid waste comprising the steps of reacting radioactive solid waste containing metallic aluminum with an alkali solution to generate a hydrogen gas and then mixing the resulting reaction liquid with a solidifying material containing a latent hydraulic material as a main component to solidify the liquid. According to the method of the invention, solidification of aluminum-containing radioactive solid waste in a highly filled state (high concentration) is feasible and a solid having excellent mechanical strength and properties of preventing oozing of radioactive nuclide can be obtained.

13 Claims, No Drawings

METHOD OF DISPOSAL OF METALLIC ALUMINUM-CONTAINING RADIOACTIVE SOLID WASTE

FIELD OF THE INVENTION

The present invention relates to a method of disposal of metallic aluminum-containing radioactive solid waste using inorganic solidifying materials.

BACKGROUND OF THE INVENTION

In facilities concerned to radioactive substances, such as atomic power plants, facilities for experiments relating to atomic power, nuclear fuel handling facilities, fuel reprocessing plant and ships using atomic power as motive power, a large quantity of radioactive solid waste is produced. For disposal of incombustible radioactive solid waste among the radioactive solid waste, a method of solidifying the radioactive solid waste with cement, a method of compressing the radioactive solid waste, and a method of melting the radioactive solid waste at high temperatures and solidifying the molten waste, etc. are known.

Most of the incombustible radioactive solid waste contains metallic aluminum. For example, high efficiency particulate air filters for exhausted gas, which are so called "HEPA filers" and are used in the system for purifying air inside buildings such as atomic power plants, comprise a glass fiber filter and an aluminum spacer.

In the disposal method by heating and melting the radioactive solid waste containing aluminum, the aluminum is oxidized to thereby form an $Al_2O_3$ layer on a surface of the sheet-like or massive radioactive solid waste. This layer is a protective layer, whereby the sheet-like or massive radioactive solid waste is not melted and remains unchanged as it is.

In the disposal method by solidifying the radioactive solid waste containing aluminum with hydraulic cement such as Portland cement, when the solid waste is mixed with the cement, calcium hydroxide in the cement reacts with aluminum to generate bubbles of a hydrogen gas, and setting of cement begins before generation of a hydrogen gas is completed. Therefore, no dense cement solid can be obtained, and the resulting cement solid has poor mechanical strength and insufficient properties of preventing oozing of radioactive nuclide.

For the disposal of the radioactive waste containing metallic aluminum by means of solidification, a method in which aluminum is previously reacted with an alkali substance or hydrogen peroxide to generate a hydrogen gas and thereby solidifying with cement has been proposed in, for example, Japanese Patent Laid-Open Publication No. 32000/1986 and No. 28700/1992. In the use of Portland cement hitherto applied, however, if the alkali concentration is too high, quick setting reaction takes place in the mixing process. As a result, operations for the solidification become impossible, or if possible, any cement solid having good solid properties (e.g., compression strength) cannot be obtained.

It has been also proposed that lithium nitrate is added to inhibit corrosion caused by the reaction of aluminum in the radioactive solid waste with cement. However, whether the inhibition effect exerted by the corrosion inhibitor continues over hundreds years has not been clarified.

Under such circumstances as described above, the present inventors have earnestly studied methods of disposal of radioactive solid waste containing aluminum, and as a result, we have found that disposal of the radioactive solid waste can be efficiently made by previously reacting the aluminum with an alkali substance to generate a hydrogen gas and then adding a solidifying material containing a latent hydraulic material as a main component to the reaction liquid to solidify the liquid. The present inventors have also found that the solid thus obtained has excellent mechanical strength and properties of preventing oozing of radioactive nuclide. Based on the finding, the present invention has been accomplished.

OBJECT OF THE INVENTION

It is an object of the present invention to provide a method of disposal of aluminum-containing radioactive solid waste by which solidification of aluminum-containing radioactive solid waste in a highly filled state (high concentration) is feasible and a solid having excellent mechanical strength and properties of preventing oozing of radioactive nuclide can be obtained.

SUMMARY OF THE INVENTION

The method of disposal of metallic aluminum-containing radioactive solid waste according to the present invention comprises the steps of reacting radioactive solid waste containing metallic aluminum with an alkali solution to generate a hydrogen gas and then mixing the resulting reaction liquid with a solidifying material containing a latent hydraulic material as a main component to solidify the liquid.

The alkali agent in the alkali solution is at least one alkali agent selected from the group consisting of alkali metal hydroxides, alkaline earth metal hydroxides, alkali metal carbonates and alkali metal silicates. The molar ratio of the alkali agent to the metallic aluminum is preferably not less than 5/10 (alkali/aluminum).

The method of disposal of metallic aluminum-containing radioactive solid waste according to the invention is advantageously used especially when the radioactive solid waste containing metallic aluminum is incinerator ash.

When the metallic aluminum-containing radioactive solid waste is a glass fiber-containing fine particle filter for purifying exhaust gas, it is preferable that the glass fibers contained in this filter are also dissolved in the alkali solution during the reaction of the metallic aluminum contained in the filter with the alkali solution.

When the metallic aluminum-containing radioactive solid waste is miscellaneous solid waste, it is preferable that the metallic aluminum contained in the miscellaneous solid waste is reacted with the alkali solution, then an insoluble miscellaneous solid is removed, and a solidifying material containing a latent hydraulic material as a main component is added to the resulting reaction liquid to solidify the liquid.

When the metallic aluminum-containing radioactive solid waste is miscellaneous solid waste, it may be that the metallic aluminum contained in the miscellaneous solid waste is reacted with the alkali agent, then an insoluble miscellaneous solid is removed, thereafter the resulting reaction liquid is subjected to solid-liquid separation to obtain a precipitate as a solid matter, and a solidifying material containing a latent hydraulic material as a main component is added to the solid matter to solidify the solid matter.

The solidifying material may further contain, in addition to the latent hydraulic material, an ultrafine powder substance and an inorganic needle-like substance, if needed.

As the latent hydraulic material, at least one substance selected from the group consisting of blast-furnace slag, converter slag and incinerator fly ash can be employed.

As the ultrafine powder substance, at least one powder substance selected from the group consisting of silica fume, a silica rock powder, an alumina powder and ultrafine anhydrous silica can be employed.

As the inorganic needle-like substance, at least one substance selected from the group consisting of wollastonite, sepiolite, asbestos, carbon fibers and alumina fibers can be employed.

DETAILED DESCRIPTION OF THE INVENTION

The method of disposal of metallic aluminum-containing radioactive solid waste according to the present invention is described in detail hereinafter.

In the method of disposal of metallic aluminum-containing radioactive solid waste according to the invention, the radioactive solid waste containing metallic aluminum is reacted with an alkali solution to generate a hydrogen gas, and then the resulting reaction liquid is mixed with a solidifying material containing a latent hydraulic material as a main component to solidify the liquid. In this method, the solidifying material may be added to the reaction liquid, or on the contrary, the reaction liquid may be added to the solidifying material.

The radioactive solid waste containing metallic aluminum is incombustible solid waste produced in facilities concerned to radioactive substances, such as atomic power plants, facilities for experiments relating to atomic power, nuclear fuel handling facilities, fuel reprocessing plant and ships using atomic power as motive power, and it contains metallic aluminum. Examples of the radioactive solid waste containing metallic aluminum include incinerator ash produced after combustible waste is incinerated, glass fiber-containing high efficiency particulate air filters for purifying exhaust gas (HEPA filters), and miscellaneous solid waste such as heat insulator cover and power drill.

The alkali agent in the alkali solution is preferably at least one alkali agent selected from the group consisting of alkali metal hydroxides, such as sodium hydroxide and potassium hydroxide; alkaline earth metal hydroxides, such as calcium hydroxide; alkali metal carbonates, such as sodium carbonate and potassium carbonate; and alkali metal silicates, such as sodium silicate. Of these, preferable are alkali metal hydroxides, and particularly preferable is sodium hydroxide.

The alkali solution is generally a solution of the alkali agent in water, and the alkali concentration of the alkali solution can be appropriately determined in consideration of a rate of the reaction between alkali and aluminum, said rate being dependent on the shape of the metallic aluminum in the waste, etc., and controllability of the reaction heat. The alkali concentration is usually in the range of 10 to 50% by weight.

It is desired that the alkali agent be reacted with the metallic aluminum contained in the radioactive solid waste in a molar ratio (alkali/aluminum) of not less than 5/10, preferably 5/10 to 12/1.

When the molar ratio of the alkali agent to the metallic aluminum (alkali/aluminum) is not more than 1, a precipitate (precipitate of aluminum hydroxide) is occasionally formed in the reaction liquid. In this case, a slurry (reaction liquid) containing the precipitate of aluminum hydroxide can be mixed as it is with a solidifying material containing a latent hydraulic material as a main component to solidify the slurry. Or, it is possible that the precipitate of aluminum hydroxide is separated from the slurry, and the precipitate (solid matter) thus separated is mixed with a solidifying material containing a latent hydraulic material as a main component to solidify it. The reaction liquid obtained after the solid-liquid separation can be used again as the alkali solution. When the reaction liquid is used again as the alkali solution, alkali may be replenished for that removed with the precipitation of aluminum hydroxide.

Though the reaction of the metallic aluminum with the alkali solution vary depending on composition of the radioactive waste or intensity of stirring, the reaction temperature is usually not lower than 25° C., preferably 50 to 120° C.

In the present invention, the reaction liquid obtained by the reaction of the metallic aluminum with the alkali solution is mixed with a solidifying material (SC material) containing a latent hydraulic material as a main component to solidify the liquid.

Examples of the latent hydraulic materials include blast-furnace slag, converter slag and incinerator fly ash. These substances may be used in combination of two or more kinds. Of these, blast-furnace slag is preferable.

It is desired that the blast-furnace slag has a blaine specific surface area of not less than 1,000 $cm^2/g$, preferably 2,000 to 20,000 $cm^2/g$, particularly preferably 5,000 to 10,000 $cm^2/g$.

Two or more kinds of the blast-furnace slag having different blaine specific surface areas can be used in combination. For example, blast-furnace slag (S) having a blaine specific surface area of 2,000 to 5,000 $cm^2/g$ and blast-furnace slag (L) having a blaine specific surface area of 10,000 to 30,000 are employable in combination, and they can be used in a S/L ratio (by weight) of usually 1 to 20, preferably 2 to 10.

The solidifying material for use in the invention may contain an ultrafine powder substance, if needed.

The ultrafine powder substance has a mean particle diameter smaller than that of the latent hydraulic material. The mean particle diameter of the ultrafine powder substance is smaller than that of the latent hydraulic material by preferably at least one order, more preferably two or more orders. Specifically, the mean particle diameter of the ultrafine powder substance is usually not more than 10 $\mu$m, preferably 0.01 to 2 $\mu$m.

Examples of the ultrafine powder substances include silica fume, a silica rock powder, an alumina powder and ultrafine anhydrous silica. These substances may be used in combination of two or more kinds. Of these, silica fume is preferable.

The ultrafine powder substance can be used in an amount of usually 2 to 100 parts by weight, preferably 5 to 30 parts by weight, based on 100 parts by weight of the latent hydraulic material.

The solidifying material for use in the invention may further contain an inorganic needle-like substance in addition to the ultrafine powder substance, if needed. Examples of the inorganic needle-like substances include wollastonite, sepiolite, asbestos, carbon fibers and alumina fibers. These substances may be used in combination of two or more kinds. Of these, wollastonite is preferable.

The inorganic needle-like substance can be used in an amount of usually 1 to 50 parts by weight, preferably 2 to 20 parts by weight, based on 100 parts by weight of the total of the latent hydraulic material and the ultrafine powder substance.

The solidifying material for use in the invention may furthermore contain $^{14}C$ absorbents such as quick lime, slaked lime and Portland cement. The $^{14}C$ absorbent may be contained in the solidifying material in an amount of usually about 2 to 40% by weight.

The solidifying material containing the latent hydraulic material as a main component can be obtained by powder mixing the above components in the prescribed amounts.

In the present invention, the solidifying material is used in an amount of usually 25 to 100 parts by weight, preferably 34 to 80 parts by weight, based on 100 parts by weight of the reaction liquid.

When the reaction liquid obtained by the reaction of the radioactive solid waste containing metallic aluminum with the alkali solution is solidified using the solidifying material (SC material) containing the latent hydraulic material as a main component, an aqueous solution of alkali metal hydroxide such as NaOH may be optionally added as an alkali activator to the reaction liquid given after completion of generation of hydrogen or added together with solidifying material. The alkali activator having a concentration of about 10 to 50% by weight can be used in an amount of usually 3 to 30 parts by weight, preferably 10 to 20 parts by weight, based on 100 parts by weight of the solidifying material.

In the event that it is difficult to knead the reaction liquid or a mixed slurry of the reaction liquid and the solidifying material because of too high viscosity, a dispersant may be used.

Examples of the dispersants employable herein include polymers having carboxylic acid group or its salt in the molecule, such as poly(meth)acrylic acid, acrylic acid/maleic acid copolymer, acrylic acid/maleic acid/vinyl ether copolymer, acrylic acid/itaconic acid/styrene copolymer, acrylic acid/itaconic acid/methacrylic acid/styrene copolymer, maleic anhydride/$C_5$–$C_8$ olefin copolymer, and salts thereof (e.g., sodium salts).

Examples of the $C_5$–$C_8$ olefins include 2-methyl-1-butene, 1-pentene, 1-hexene, amylene, cyclopentene and cyclohexene.

Also employable are formalin condensate of naphthalenesulfonic acid and lignin sulfonic acid condensate, which are generally used as water reducing agents for cement.

Of the above dispersants, preferable are sodium salt of acrylic acid/maleic acid copolymer, sodium salt of maleic acid/$C_5$–$C_8$ olefin copolymer and sodium salt of acrylic acid/itaconic acid/styrene copolymer.

The dispersant can be used in an amount of usually 0.1 to 15 parts by weight, preferably 0.5 to 6 parts by weight, based on 100 parts by weight of the total of the latent hydraulic material and the ultrafine powder substance optionally used.

It is preferable that the dispersant is used as its aqueous solution having a concentration of about 10 to 50% by weight.

Details of the solidifying material containing a latent hydraulic material as a main component are described in Japanese Patent Laid-Open Publication No. 179095/1996 previously applied for by the present applicant, and the technique described in the publication can be utilized for the present invention.

In the present invention, the solidifying material containing a latent hydraulic material as a main component and other components optionally used such as a dispersant are added to the alkali solution in which metallic aluminum is dissolved, and the resulting mixture is kneaded and cured to be solidified.

It is desired that the solid obtained by the above method has a compression strength of not less than 15 kgf/cm$^2$, preferably not less than 80 kgf/cm$^2$.

According to the disposal method of the invention, the metallic aluminum in the metallic aluminum-containing radioactive solid waste reacts with the alkali agent to generate a hydrogen gas, and becomes aluminum hydroxide or alkali aluminate. On this account, even if the radioactive solid waste after the above reaction (generation of hydrogen gas) is solidified, reaction of the solidifying material with the metallic aluminum does not take place, and hence the resulting solid is free from occurrence of voids or cracks and has excellent mechanical strength and properties of preventing oozing of radioactive nuclide.

Further, even if the radioactive solid waste which is insoluble in alkali is melted and solidified after the above treatment, the metallic aluminum does not remain as it is because the metallic aluminum has already become aluminum hydroxide or alkali aluminate. Therefore, inhibition of melting of the sheet-like or massive radioactive solid waste by a layer of $Al_2O_3$ does not take place.

Some embodiments of the method of disposal of metallic aluminum-containing radioactive solid waste according to the invention are given below.

Solidification of Incinerator Ash

To a kneader, an alkali solution and a predetermined amount of water are introduced, and thereto is slowly added incinerator ash. The metallic aluminum in the incinerator ash reacts with alkali to generate a hydrogen gas. The reaction time is preferably at least 10 minutes, more preferably 30 to 60 minutes, and the reaction temperature is preferably 5 to 60° C., more preferably 15 to 35° C. To the reaction liquid given after completion of generation of a hydrogen gas, a solidifying material containing a latent hydraulic material as a main component is added, and they are kneaded. Then, the kneadate is discharged from the kneader into a drum and cured therein at a temperature of room temperature to about 60° C. to solidify the kneadate.

Solidification of HEPA Filter

The HEPA filter includes a glass fiber filter zigzag fixed and aluminum spacers placed among gaps of the filter.

For solidification disposal of the HEPA filter, the filter portion (glass fibers and metallic aluminum) is cut into an appropriate size, and the filter thus cut is kneaded with an alkali solution. The aluminum spacers react with the alkali solution to generate a hydrogen gas. The reaction liquid is heated to a temperature of 40 to 120° C., preferably 70 to 120° C., particularly preferably 90 to 100° C., and is stirred for 10 to 50 hours, preferably 20 to 40 hours, to dissolve the glass fibers in the alkali solution. To the resulting solution, a solidifying material containing a latent hydraulic material as a main component is added, and they are kneaded. The kneadate is discharged into a drum and cured therein at a temperature of room temperature to 60° C. to solidify the kneadate.

Solidification of Miscellaneous Solid Waste

Some miscellaneous solid waste, such as heat insulator cover or power drill, contains metallic aluminum. After the metallic aluminum is dissolved, the portions of the waste, which are made from other materials than metallic aluminum, are separated, and solidified by a method such as filling solidification.

In the disposal of the miscellaneous solid waste containing metallic aluminum, the solid waste is placed in, for example, a basket and immersed in an alkali solution to react them until generation of hydrogen is completed, and miscellaneous solid waste which is insoluble in alkali is removed. Then, to the resulting reaction liquid, a solidifying material containing a latent hydraulic material as a main component is added, and they are kneaded. The kneadate is discharged into a drum and cured therein at a temperature of room temperature to 60° C. to solidify the kneadate.

When a proportion of the metallic aluminum in the miscellaneous solid waste to the alkali is high (aluminum/alkali (molar ratio): not less than 1), aluminum hydroxide is precipitated. In this case, the following method may be conducted. That is, the metallic aluminum in the miscellaneous solid waste is reacted with the alkali solution until generation of hydrogen is completed, and miscellaneous solid waste which is insoluble in alkali is removed. Then, a precipitate (solid matter) of aluminum hydroxide in the resulting reaction liquid (slurry) is separated. To the solid matter, a solidifying material containing a latent hydraulic material as a main component is added, and they are kneaded in the presence of water. The kneadate is discharged into a drum and cured therein at a temperature of room temperature to 60° C. to solidify the kneadate. Since the aluminum hydroxide as a solid matter has been already separated in this method, the filling efficiency in the drum can be increased. If the reaction liquid given after the liquid-solid separation is returned into the alkali solution bath, the reaction liquid can be used again as the dissolving solution for the metallic aluminum.

EFFECT OF THE INVENTION

According to the disposal method of the invention, the metallic aluminum in the metallic aluminum-containing radioactive solid waste is reacted with the alkali solution and thereby becomes aluminum hydroxide or alkali aluminate, so that even if the reaction liquid is solidified, occurrence of voids or cracks does not take place in the resulting solid. Consequently, the solid can retain excellent mechanical strength and properties of preventing oozing of radioactive nuclide.

Further, when the glass fiber-containing filter for purifying exhaust gas is subjected to the disposal method of the invention, not only the metallic aluminum but also the glass fibers of the filter can be dissolved and solidified.

Moreover, when the miscellaneous solid waste is subjected to the disposal method of the invention, metallic aluminum in the miscellaneous solid waste of complicated shape can be selectively treated.

EXAMPLE

The present invention is further described with reference to the following examples, but it should be construed that the invention is in no way limited to those examples.

In the following Examples, an aqueous solution of sodium salt of amylene/maleic anhydride copolymer (concentration: 40% by weight) was used as a dispersant.

Evaluation

Properties of the slurry and the solid obtained by the disposal method of the present invention were evaluated in the following manner.

(1) Flow Value

A flow value of the slurry obtained after kneading was measured in accordance with JIS R5201.

(2) Compression Strength

The slurry obtained after kneading was cast into a form (4 cm×4 cm, height: 16 cm) for compression strength test and cured therein at 60° C. for 24 hours to obtain a solid. The solid was compressed at a loading rate of 0.2 mm/min by means of an Amsler type universal testing machine to break the solid. The load at which the solid was broken was measured, and the measured value was divided by a sectional area of the solid to determine the compression strength.

(3) Water Resistance

The slurry obtained after kneading was cast into a form (diameter: 4.5 cm, height: 4.4 cm) for water resistance test and cured therein at 60° C. for 24 hours to obtain a solid. The solid was immersed in deionized water 10 times as much as the volume of the solid. After a period of 1 week to 3 months, the solid was measured on the change in weight and change in volume, and further observed on occurrence of crazes and cracks and shape retention to evaluate water resistance. The solid which retained its original shape even after 1 week to 3 months was ranked as AA.

(4) Generation of Gas

The solid was immersed in a 1N-sodium hydroxide solution, and generation of gas was judged by an underwater substitution method.

Example 1

Solidification of Incinerator Ash

In accordance with the results of analysis of incinerator ash stored in an atomic power plant, 63.2% by weight of kaolin, 10.0% by weight of talc, 18.6% by weight of ferric oxide, 3.5% by weight of gypsum dihydrate, 1.1% by weight of an iron powder and 0.5% by weight of metallic aluminum were mixed to give a mimic incinerator ash.

As the solidifying material (SC material) containing a latent hydraulic material as a main component, the following SC material (1) was used.

SC Material (1)

Blast-furnace slag (blaine specific surface area=8,000 $cm^2/g$): 90 parts by weight Silica fume: 10 parts by weight Into a mortar mixer manufactured by Marubishi Kikai K.K., 264 g of a 25 wt % NaOH aqueous solution as an alkali solution and 500 g of water were introduced. Then, 1,066 g of the mimic incinerator ash was slowly fed to the mixer with stirring at 140 rpm. After about 5 minutes, generation of hydrogen was confirmed. After 30 minutes, generation of hydrogen came to be hardly observed. After 1 hour from the beginning of feeding the mimic incinerator ash, 86 g of the dispersant, 635 g of the SC material (1), 113 g of a 25 wt % NaOH aqueous solution and 100 g of water were added, and the mixture was kneaded for 5 minutes. A flow value of the slurry obtained after kneading, a compression strength of the solid, water resistance thereof and generation of gas were evaluated. The results are set forth in Table 1.

Example 2

The procedure of Example 1 was repeated except that 113 g of the 25 wt % NaOH aqueous solution was not added. Then, the same evaluation as in Example 1 was carried out. The results are set forth in Table 1.

Example 3

Solidification of HEPA Filter

A wooden frame of a HEPA filter available from Cambridge Co. was disjointed to separate a zigzag glass filter and metallic aluminum spacers from the wooden frame. The glass filter was cut into pieces of 1 to 3 cm.

Into a mortar mixer manufactured by Marubishi Kikai K.K. was introduced 100 g of a 25 wt % NaOH aqueous solution, and thereto was fed 15.2 g of the metallic aluminum spacers with stirring the NaOH aqueous solution at 140 rpm. After generation of hydrogen was completed, the glass filter was immersed in the solution of metallic aluminum, and the solution was stirred at 90° C. for 24 hours to dissolve the glass filer therein. To the resulting solution, 3.5 g of the dispersant and 75 g of the following SC material (2) were added, and the mixture was kneaded for 5 minutes. A flow value of the slurry obtained after kneading, a compression strength of the solid, water resistance thereof and generation of gas were evaluated. The results are set forth in Table 1.

The filling ratio of the metallic aluminum to the obtained solid was 7.5% by weight. This indicates that about eight HEPA filters can be filled in a 200-liter drum because one HEPA filter contains about 3 kg of metallic aluminum.

SC Material (2)

Blast-furnace slag (blaine specific surface area=10,000 $cm^2/g$): 90 parts by weight Silica fume: 10 parts by weight Wollastonite: 10 parts by weight

TABLE 1

|  | Ex. 1 | Ex. 2 | Ex. 3 |
| --- | --- | --- | --- |
| Na/Al molar ratio | 11.9 | 8.4 | 1.1 |
| Flow value (mm) | 220 | 260 | 240 |
| Specific gravity (g/cm³) | 1.8 | 1.8 | 1.78 |
| Compression strength (kgf/cm²) | 104 | 145 | 90 |
| Water resistance |  |  |  |
| Change in weight (%) | +0.1 | +0.35 | +0.46 |
| Change in volume (%) | −0.02 | −0.25 | +1.90 |
| Water resistance | AA | AA | AA |
| Generation of gas | none | none | none |

Example 4

18 Grams of metallic aluminum, 1,066 g of a 25 wt % NaOH aqueous solution and 332.5 g of water were slowly mixed to react them and thereby prepare a mimic solution in which the metallic aluminum was dissolved.

To the mimic solution were added 800 g of the SC material (1) and 32 g of the dispersant, and the mixture was kneaded for 5 minutes by a mortar mixer. The flow value, specific gravity, compression strength and water resistance were evaluated. The results are set forth in Table 2.

Example 5

180 Grams of metallic aluminum, 1,066 g of a 25 wt % NaOH aqueous solution and 332.5 g of water were mixed to react them and thereby prepare a mimic solution in which the metallic aluminum was dissolved.

To the mimic solution were added 1,200 g of the following SC material (3) and 48 g of the dispersant, and the mixture was kneaded by a mortar mixer for 5 minutes. The flow value, specific gravity, compression strength and water resistance were evaluated. The results are set forth in Table 2.

SC Material (3)

Blast-furnace slag (blaine specific surface area=4,500 $cm^2/g$): 70 parts by weight Silica fume: 10 parts by weight Slaked lime: 20 parts by weight Example 6

138.9 Grams of metallic aluminum, 710 g of a 25 wt % NaOH aqueous solution and 311.6 g of water were mixed to react them and thereby prepare a mimic solution in which the metallic aluminum was dissolved.

To the mimic solution were added 918 g of the SC material (1) and 36.7 g of the dispersant, and the mixture was kneaded by a mortar mixer for 5 minutes. The flow value, specific gravity, compression strength and water resistance were evaluated. The results are set forth in Table 2.

Example 7

120 Grams of metallic aluminum, 497.7 g of a 25 wt % NaOH aqueous solution and 418 g of water were mixed to react them and thereby prepare a mimic solution in which the metallic aluminum was dissolved.

To the mimic solution were added 800 g of the SC material (2) and 32 g of the dispersant, and the mixture was kneaded by a mortar mixer for 5 minutes. The flow value, specific gravity, compression strength and water resistance were evaluated. The results are set forth in Table 2.

Example 8

180 Grams of metallic aluminum, 533.3 g of a 25 wt % NaOH aqueous solution and 492 g of water were mixed to react them and thereby prepare a mimic solution in which the metallic aluminum was dissolved.

To the mimic solution were added 600 g of the SC material (3) and 22.2 g of the dispersant, and the mixture was kneaded by a mortar mixer for 5 minutes. The flow value, specific gravity, compression strength and water resistance were evaluated. The results are set forth in Table 2.

Example 9

153 Grams of metallic aluminum, 1,000 g of a 25 wt % NaOH aqueous solution and 43 g of water were mixed to react them and thereby prepare a mimic solution in which the metallic aluminum was dissolved.

To the mimic solution were added 700 g of the following SC material (4) and 35 g of the dispersant, and the mixture was kneaded by a mortar mixer for 5 minutes. The flow value, specific gravity, compression strength and water resistance were evaluated. The results are set forth in Table 2.

SC Material (4)

Blast-furnace slag (blaine specific surface area=4000 $cm^2/g$): 90 parts by weight Slaked lime: 10 parts by weight Comparative Example 1

180 Grams of metallic aluminum, 1,066 g of a 25 wt % NaOH aqueous solution and 32.5 g of water were mixed to react them and thereby prepare a mimic solution in which the metallic aluminum was dissolved.

To the mimic solution were added 1,200 g of Portland cement and 48 g of the dispersant, and the mixture was kneaded by a mortar mixer. As a result, a part of the cement was quickly set, and no good solid was obtained.

TABLE 2

| | Ex. 4 | Ex. 5 | Ex. 6 | Ex. 7 | Ex. 8 | Ex. 9 | Comp. Ex. 1 |
|---|---|---|---|---|---|---|---|
| Na/Al molar ratio | 10 | 1.0 | 0.86 | 0.7 | 0.5 | 1.1 | 1.0 |
| Flow value (mm) | 240 | 230 | 210 | 215 | 241 | 212 | — |
| Specific gravity (g/cm$^3$) | 1.8 | 1.8 | 1.8 | 1.8 | 1.7 | 1.8 | — |
| Compression strength (kgf/cm$^2$) | 110 | 180 | 300 | 315 | 138 | 102 | — |
| Water resistance | AA | AA | AA | AA | AA | AA | — |

What is claimed is:

1. A method of disposal of metallic aluminum-containing radioactive solid waste, comprising the steps of:
   reacting radioactive solid waste containing metallic aluminum with an alkali solution to generate a hydrogen gas and a resulting reaction liquid; and
   mixing the resulting reaction liquid with a solidifying material containing a latent hydraulic material as a main component to solidify the liquid.

2. The method of disposal of metallic aluminum-containing radioactive solid waste as claimed in claim 1, wherein an alkali agent in the alkali solution is at least one alkali agent selected from the group consisting of alkali metal hydroxides, alkaline earth metal hydroxides, alkali metal carbonates and alkali metal silicates.

3. The method of disposal of metallic aluminum-containing radioactive solid waste as claimed in claim 1, wherein the molar ratio of the alkali agent to the metallic aluminum (alkali/aluminum) is not less than 5/10.

4. The method of disposal of metallic aluminum-containing radioactive solid waste as claimed in claim 1, wherein the radioactive solid waste containing metallic aluminum is incinerator ash.

5. The method of disposal of metallic aluminum-containing radioactive solid waste as claimed in claim 1, wherein the radioactive solid waste containing metallic aluminum is a glass fiber-containing fine particle filter for purifying exhaust gas; and when the metallic aluminum contained in the filter is reacted with the alkali solution, the glass fibers contained in the filter are also dissolved in the solution.

6. A method of disposal of metallic aluminum-containing radioactive solid waste, comprising the steps of:
   reacting radioactive solid waste containing metallic aluminum with an alkali solution to generate a hydrogen gas, wherein the radioactive solid waste containing metallic aluminum is miscellaneous solid waste;
   removing an insoluble miscellaneous solid after the metallic aluminum contained in the miscellaneous solid waste is reacted with the alkali solution; and
   adding a solidifying material containing a latent hydraulic material as a main component to the resulting reaction liquid to solidify the liquid.

7. A method of disposal of metallic aluminum-containing radioactive solid waste comprising the steps of:
   reacting radioactive solid waste containing metallic aluminum with an alkali solution to generate a hydrogen gas, wherein the radioactive solid waste containing metallic aluminum is miscellaneous solid waste;
   removing an insoluble miscellaneous solid after the metallic aluminum contained in the miscellaneous solid waste is reacted with the alkali solution;
   subjecting the resulting reaction liquid to solid-liquid separation to obtain a precipitate as a solid matter; and
   adding a solidifying material containing a latent hydraulic material as a main component to the precipitate to solidify the precipitate.

8. The method of disposal of metallic aluminum-containing radioactive solid waste as claimed in claim 1, wherein the solidifying material contains an ultrafine powder substance in addition to the latent hydraulic material.

9. The method of disposal of metallic aluminum-containing radioactive solid waste as claimed in claim 8, wherein the solidifying material contains an inorganic needle-like substance in addition to the latent hydraulic material and the ultrafine powder substance.

10. The method of disposal of metallic aluminum-containing radioactive solid waste as claimed in claim 1, wherein the latent hydraulic material is at least one substance selected from the group consisting of blast-furnace slag, converter slag and incinerator fly ash.

11. The method of disposal of metallic aluminum-containing radioactive solid waste as claimed in claim 8, wherein the ultrafine powder substance is at least one powder substance selected from the group consisting of silica fume, a silica rock powder, an alumina powder and ultrafine anhydrous silica.

12. The method of disposal of metallic aluminum-containing radioactive solid waste as claimed in claim 9, wherein the inorganic needle-like substance is at least one substance selected from the group consisting of wollastonite, sepiolite, asbestos, carbon fibers and alumina fibers.

13. The method of disposal of metallic aluminum-containing radioactive solid waste as claimed in claim 9, wherein the ultrafine powder substance is at least one powder substance selected from the group consisting of silica fume, a silica rock powder, an alumina powder and ultrafine anhydrous silica.

* * * * *

UNITED STATES PATENT AND TRADEMARK OFFICE
CERTIFICATE OF CORRECTION

PATENT NO. : 5,973,220
DATED : October 26, 1999
INVENTOR(S) : Tadashi Sasaki et al.

It is certified that error appears in the above-identified patent and that said Letters Patent is hereby corrected as shown below:

Column 1 Line 26 "HEPA filers" should read --HEPA filters--.

Column 9 Line 10 "the glass filer" should read --the glass filter--.

Signed and Sealed this

Thirteenth Day of June, 2000

*Attest:*

Q. TODD DICKINSON

*Attesting Officer*     *Director of Patents and Trademarks*